May 25, 1937.    H. G. BROWN    2,081,659
AUTOMATIC SAFETY DEVICE FOR HYDRAULIC BRAKES
Filed July 28, 1936
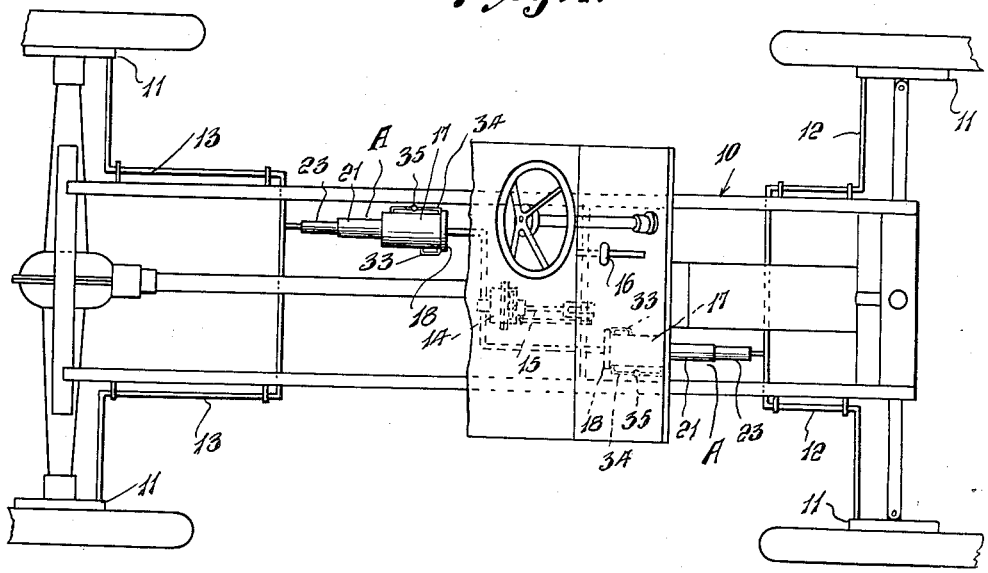
Fig. 1.
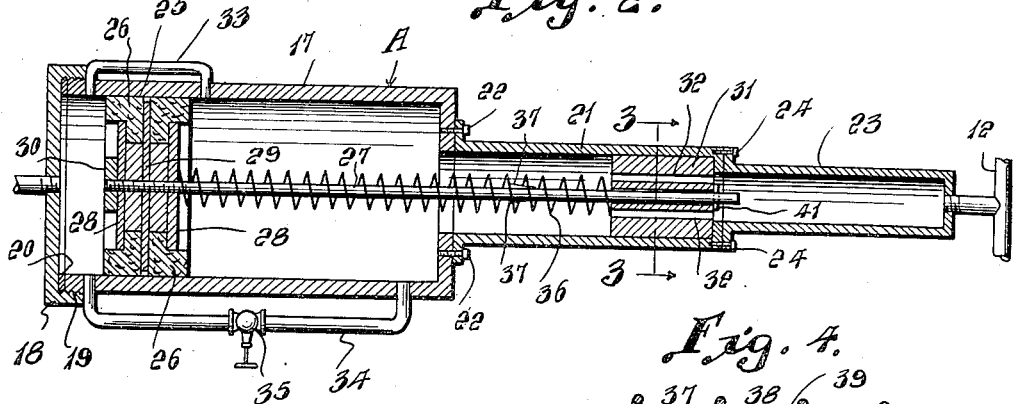
Fig. 2.
Fig. 3.
Fig. 4.
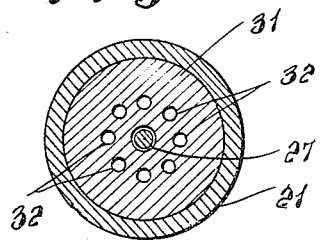
Inventor
Harold G. Brown
By L. F. Randolph
Attorney Patented May 25, 1937

2,081,659

UNITED STATES PATENT OFFICE 2,081,659

AUTOMATIC SAFETY DEVICE FOR HYDRAULIC BRAKES

Harold G. Brown, Scottsville, Ky.

Application July 28, 1936, Serial No. 93,062

2 Claims. (Cl. 303—84)

This invention relates to an automatic safety valve and cylinder for use singly or in plurality in hydraulic brake systems to render them safe at one pair of brakes, in the event the other pair should fail because of leakage of the hydraulic fluid.

The more specific objects and advantages will become apparent from a consideration of the description following taken in connection with accompanying drawing illustrating an operative embodiment.

In said drawing:—

Figure 1 is a plan view illustrating my improvements as applied to an automobile, parts of the latter being omitted for the sake of clearness;

Figure 2 is an enlarged longitudinal sectional view through the automatic safety valve and cylinder device of the invention;

Figure 3 is a detail section taken on the line 3—3 of Figure 2, and

Figure 4 is an enlarged longitudinal sectional view disclosing the latch means carried by the piston rod.

Referring specifically to the drawing wherein like reference characters designate like or similar parts, 10 designates a conventional automobile or self-propelled vehicle, having brakes 11, one at each wheel, of any conventional form operated hydraulically by fluid in piping at 12 for the front wheels and piping 13 for the rear wheels, such piping 12 and 13 being in communication with the usual master cylinder 14, in which a plunger or piston 15 operates through the depression of the usual brake lever 16.

An automatic safety valve and cylinder device generally designated A is interposed between the master cylinder and piping 13 and in communication with them and another of such devices A is interposed between the master cylinder and the piping 12 and in communication with them.

Referring to said devices A specifically, they consist of cylinders 17 closed at one end by a cap plate 18, screwed thereto as at 19 with a suitable gasket 20 interposed. The piping 13 or piping 12, as the case may be, is connected to the cap 18 as best shown in Figure 2.

Cylinder 17 has an auxiliary cylinder 21 bolted thereto as at 22 and to which an extension cylinder 23 is bolted at 24, the extension cylinder 23 having another part of the piping 13 or 12 as the case may be connected to it.

Operable within the cylinder 17 is a suitable piston 25 which may consist of a pair of suitable leather or other cups 26, connected to a piston rod 27 by means of plates 28 and 29 and a nut 30. A guide block 31 in which the forward end of the rod 27 slides is positioned within the auxiliary cylinder 21 and it has a plurality of passages 32 therethrough surrounding the rod 27.

The normal position of the piston 25 is shown in Figure 2 and a by-pass conduit 33 communicates with the cylinder 17 on opposite sides of and relatively close to the piston.

A normally closed by-pass conduit 34 also communicates with the cylinder 17 on opposite sides of the piston 25. It is normally closed by a valve 35 therein. Such by-pass 34 allows the hydraulic fluid to pass around the piston 25 while filling or bleeding the brake. An expansive coil spring 36 surrounds the rod 27, abutting the piston and the guide 31 at opposite ends, urging the piston to the normal position of Figure 2.

Latch members 37 by means of spring portions 38 are screwed or otherwise fastened at 39 to the rod 27. Such latch portions 37 are disposed adjacent clearance slots 40 of the rod 27 so that the latch members may be completely pressed within the slots 40 to permit passage through the block or guide 31 and to permit them to thereupon snap to an expanded position as in Figure 4, so that the piston 25 cannot return to its normal position unless released. Movement of the rod 27 and piston 25 to normal position is limited by an abutment, such as a removable pin, at 41 on the rod, with the guide member 31.

The brake pedal 16 may be operated as usual with the devices A installed as shown as long as there is no leakage of the hydraulic fluid from the system, such fluid being pumped in the usual manner by operation of the brake pedal or lever, from the master cylinder through the piping 12 and 13, the improved devices A, passing through the by-passes 33, cylinder 17, auxiliary cylinder 21 and passages 32 and cylinder extension 23. However, should hydraulic fluid be lost by leakage at one of the front wheels, the application of the brake pedal thereafter will cause the fluid from the master cylinder to so act on the piston 25 as to press it forwardly, practically immediately closing the by-pass 33, the forward movement continuing until the latches 37 pass through the guide block 31, thereupon they will expand and prevent retraction of the piston. During such motion however the rear brakes will be applied as usual.

The piston 25 of the forward device A will not be restored to operating position until the disabled device A is repaired. It will prevent the escape of further hydraulic fluid through the leak at the front wheel or wheels. On the other hand, if the rear wheel brakes should leak, the movement of the brake pedal 16 will operate the front brakes in the usual manner but the fluid from the master cylinder will displace the piston 25 and lock it in a position preventing loss of the hydraulic fluid therethrough, in the same manner as traced with respect to the forward device A should the latter become disabled.

Various changes may be resorted to provided they fall within the spirit and scope of the invention.

I claim as my invention:—

1. In combination with a hydraulic brake system having a master cylinder and brakes on opposite sides thereof, safety devices in the system normally inactive, said devices being subject to the pressure of the hydraulic fluid in the event of leakage to close the respective devices against loss of the hydraulic fluid, said devices comprising cylinders, pistons in the cylinders, by-passes from one side of the pistons to the other side, a rod extending from each piston, a guide for each piston rod, each guide having openings therethrough for the flow of the hydraulic fluid and latch means carried by each rod for coaction with the said guide to lock the piston in a position closing the cylinder against loss of hydraulic fluid, said rod having an expansive coil spring about the same engaging the piston and the guide, said latch means comprising an element resiliently connected to the rod, and said rod having a clearance slot to receive the latch when it passes through the guide.

2. In combination with a hydraulic brake system having a master cylinder and brakes on opposite sides thereof, safety devices in the system normally inactive, said devices being subject to the pressure of the hydraulic fluid in the event of leakage to close the respective devices against loss of the hydraulic fluid, said devices comprising cylinders, pistons in the cylinders, by-passes from one side of the pistons to the other side, a rod extending from each piston, a guide for each piston rod, each guide having openings therethrough for the flow of the hydraulic fluid and latch means carried by each rod for coaction with the said guide to lock the piston in a position closing the cylinder against loss of hydraulic fluid, said rod having an expansive coil spring about the same engaging the piston and the guide, said latch means comprising an element resiliently connected to the rod, and said rod having a clearance slot to receive the latch when it passes through the guide, said cylinder having a cap at one end screw threaded thereto, and also having a by-pass provided with a cut-off valve, the last mentioned by-pass allowing fluid to pass around the piston while filling or bleeding the brakes.

HAROLD G. BROWN.